US009964228B2

(12) United States Patent
Delille et al.

(10) Patent No.: US 9,964,228 B2
(45) Date of Patent: May 8, 2018

(54) AUTOCLAVE CRYOGENIC ELECTROMAGNETIC VALVE FOR A SPACE LAUNCH VEHICLE (71) Applicant: Techspace Aero S.A., Herstal (Milmort) (BE)

(72) Inventors: Antoine Delille, Pontillas (BE); Bernard Simeon, Angleur (BE); Cedric Frippiat, Jehanster (BE); Olivier Dellis, Liege (BE)

(73) Assignee: Safran Aero Boosters SA (BE)

( * ) Notice: Subject to any disclaimer, the term of this patent is extended or adjusted under 35 U.S.C. 154(b) by 94 days.

(21) Appl. No.: 15/150,463

(22) Filed: May 10, 2016

(65) Prior Publication Data
US 2016/0341328 A1 Nov. 24, 2016

(30) Foreign Application Priority Data

May 19, 2015 (BE) .................................. 2015/5306

(51) Int. Cl.
F16K 31/06 (2006.01)
(52) U.S. Cl.
CPC ........ F16K 31/062 (2013.01); F16K 31/0637 (2013.01)
(58) Field of Classification Search
CPC ............... F16K 31/062; F16K 31/0637; Y10T 137/87209; Y10T 137/87217
USPC ....................................... 137/596.16, 596.17
See application file for complete search history.

(56) References Cited

U.S. PATENT DOCUMENTS 3,040,775 A * 6/1962 Ray ..................... F15B 13/0405
137/596.17
3,371,684 A * 3/1968 Tissot-Dupont .... F15B 13/0405
137/595
3,542,333 A * 11/1970 Stampfli ................... F16K 1/34
137/625.27
(Continued)

FOREIGN PATENT DOCUMENTS

DE 8408052 U1 9/1985
EP 0127875 A2 12/1984
(Continued)

OTHER PUBLICATIONS

European Search Report from corresponding Belgium Application No. BE 201505306, dated Feb. 4, 2016.

Primary Examiner — Eric Keasel
(74) Attorney, Agent, or Firm — Sandberg Phoenix & von Gontard P.C.

(57) ABSTRACT

The invention relates to an electromagnetic valve for distributing cryogenic propellant for a space launch vehicle. The valve comprises two seats each oriented in a direction opposite to the other seat; a passage connecting the seats; and two shutters opening and closing the seats. The valve also comprises a magnetic circuit with a magnetic coil and a magnetic plunger that is driven by the magnetic flux of the coil and which in turn drives the shutters relative to their respective seats so as to open and close the seats. The plunger is placed between the shutters such that each shutter closes its seat by moving the plunger away from the corresponding seat. The movement for opening a seat is performed by moving the plunger towards the seat so that it does not crush the shutters against their seats.

16 Claims, 4 Drawing Sheets (56) References Cited

U.S. PATENT DOCUMENTS

| | | | | |
|---|---|---|---|---|
| 4,067,357 A | * | 1/1978 | Ruchser | F15B 13/0405 |
| | | | | 137/596.16 |
| 4,086,889 A | * | 5/1978 | Yagi | F02P 5/103 |
| | | | | 137/596.17 |
| 4,987,923 A | * | 1/1991 | Tackett | B60T 8/3635 |
| | | | | 137/596.17 |
| 5,393,132 A | * | 2/1995 | Yogo | B60T 8/367 |
| | | | | 251/129.07 |

FOREIGN PATENT DOCUMENTS

| | | |
|---|---|---|
| FR | 2487942 A1 | 2/1982 |
| WO | 9221904 A1 | 12/1992 |

\* cited by examiner

AUTOCLAVE CRYOGENIC ELECTROMAGNETIC VALVE FOR A SPACE LAUNCH VEHICLE

CROSS-REFERENCE TO RELATED APPLICATIONS

This application claims the benefit, under 35 U.S.C. § 119, of BE 2015/5306 filed May 19, 2015, the disclosure of which is incorporated herein by reference in its entirety.

FIELD

The invention relates to the field of electromagnetic valves. More particularly, the invention relates to an electromagnetic ball valve for supplying cryogenic fluid, such as propellant, to a space aircraft. The invention also discloses a distribution valve controlled by an electromagnetic valve.

BACKGROUND

A rocket is propelled with the aid of fuel and oxidizing agent. The fuel is generally propellant, which is contained in tanks and then distributed under cryogenic conditions in order to supply the thrusters in a precise manner, solenoid valves are connected to the tanks. The valves generally have electromagnetic actuators that utilize the current of the electric network of the rocket. The actuators must adapt to the amperage available over the network.

In order to keep an electromagnetic valve open, it is necessary to supply current continuously to the coil of the valve. However, the current that circulates there causes the valve to heat up, in some cases to as much as 100° C., which risks igniting the fuel.

The fuel and the propellant circulate in gaseous form and at a temperature reaching −200° C. and a pressure of approximately 400 bar. This pressure exerts destructive forces on the sealing elements, as do the mechanical vibrations of a rocket during take-off thereof. These vibrations can translate into accelerations of 60 g, which speed up the wear of sealing surfaces, together with the closing motion impacts.

Document FR 2 487 942 A1 discloses a valve with a distribution level and a regulation level of the distribution level. The distribution level comprises two balls cooperating with two opposite seats. A shaft disposed between these balls makes it possible to open and close them selectively, and a piston with bellows makes it possible to actuate one of these balls. The piston is controlled by the regulation level, which comprises two balls also connected by a shaft and held in a closed position by a spring. An electromagnetic actuator with a tappet plunger pushes one of the balls, which in turn pushes the other ball via the shaft.

This configuration is bulky. In addition, the ball cooperating with the plunger balls is exposed to significant forces, which degrade the seat of the ball, and therefore the seal deteriorates with use. Indeed, the closing motion means that the seat absorbs the kinetic energy of the plunger of the electromagnetic valve. At the same time, the tappet of the plunger is progressively work-hardened under force in order to crush the ball against its seat. Consequently, it is not possible to assure effective centring and correct plating of the ball towards its seat, and therefore the seal is again compromised. It would therefore be beneficial to propose a valve with a ball pushed from its seat from the corresponding orifice.

SUMMARY

The object of the invention is to solve at least one of the problems posed by the prior art. More precisely, one object of the invention is to increase the longevity of an electromagnetic ball valve. A further object of the invention is to improve the compactness of an electromagnetic valve.

The invention relates to an electromagnetic valve, in particular for cryogenic fluid, the valve comprising: two seats each oriented in a direction opposite to the other seat; a passage connecting the seats; two shutters, which each cooperate with one of the seats so as to be able to block and open the seat; a movable tappet in contact with the shutters so as to transmit the opening and closing movements from one shutter to the other; a magnetic circuit intended to convey a magnetic flux originating for example from a magnetic source; this valve being noteworthy in that the tappet comprises a magnetic material and defines a variable air gap in the magnetic circuit so as to be able to be driven by the magnetic flux in order to move the shutters relative to their respective seats.

In accordance with various advantageous embodiments of the invention the tappet is disposed between the shutters and possibly between the seats.

The invention also relates to an electromagnetic valve, in particular for cryogenic fluid, the valve comprising: two seats, each oriented in a direction opposite to the other seat; two shutters, which each cooperate with one of the seats so as to be able to block and open the seat; a passage connecting the seats; a magnetic circuit with a magnetic plunger able to be driven by a magnetic field source, the plunger moving the shutters relative to their respective seats; the valve being noteworthy in that the plunger is placed between the shutters such that each shutter closes its seat by moving the plunger away from the seat.

In accordance with various advantageous embodiments of the invention the valve comprises tappets cooperating with the shutters, in various instances each tappet being able to move one of these shutters by passing through the associated seat.

In accordance with various advantageous embodiments of the invention at least one, or each tappet is mounted movably relative to the plunger so as to be retractable in the plunger, in various instances the plunger comprising at least one or two springs configured to deploy the tappets outside the plunger.

In accordance with various advantageous embodiments of the invention at least one, or each tappet, comprises a portion of reduced thickness cooperating with one of the shutters.

In accordance with various advantageous embodiments of the invention the plunger comprises a through-duct configured to connect the seats of the passage.

In accordance with various advantageous embodiments of the invention the valve comprises at least one plunger guide, in various instances two plunger guides are disposed on either side of the plunger.

In accordance with various advantageous embodiments of the invention at least one, or each seat, is formed on a plunger guide, and at least one, or each plunger guide, is made of nonmagnetic material.

In accordance with various advantageous embodiments of the invention the valve comprises at least one or two shutter carriers, each shutter carrier being configured to center its shutter relative to the associated seat during the opening and closing movements of the shutters.

In accordance with various advantageous embodiments of the invention the valve comprises a magnetic field source, in particular a coil, one of the seats being disposed in the interior of the magnetic source, in various instances the passage passing through the magnetic source.

In accordance with various advantageous embodiments of the invention the valve comprises a plunger spring holding the plunger in a closed configuration in which one of the two shutters, referred to as the entry shutter, is closed, and in which the other of the two shutters, referred to as the exit shutter, is open.

In accordance with various advantageous embodiments of the invention the valve comprises at least one shutter spring, in various instances two shutter springs configured to hold each associated shutter in a closed position against the associated seat.

In accordance with various advantageous embodiments of the invention the passage comprises a side with an entry and an exit, and the plunger has a face configured to allow communication between the entry and the exit when the plunger is plated towards or against the entry exit side.

In accordance with various advantageous embodiments of the invention the passage comprises an opening, in particular a third opening, which is distanced from the seats connected by the passage.

In accordance with various advantageous embodiments of the invention at least one, or each shutter is a ball, in various instances having a diameter less than 4.00 mm, for example less than 2.00 mm.

In accordance with various advantageous embodiments of the invention the passage is a regulation passage, and the valve additionally comprises a fluid distribution level in communication with the regulation passage, the distribution level comprising a distribution passage, a distribution entry with a seat, a distribution exit with a seat, and two valves selectively opening and closing the distribution entry seat and the distribution exit seat.

In accordance with various advantageous embodiments of the invention the distribution valves are controlled by a distribution piston in communication with the regulation passage.

In accordance with various advantageous embodiments of the invention the face of the plunger has a clearance in order to allow a communication between the entry and the exit when the plunger is plated towards or against the entry exit side.

In accordance with various advantageous embodiments of the invention the plunger is placed between the shutters such that each shutter opens its seat by moving the plunger towards the seat.

In accordance with various advantageous embodiments of the invention the seats are fixed.

In accordance with various advantageous embodiments of the invention the valve is a three-way valve.

In accordance with various advantageous embodiments of the invention each shutter is able to close off the circulation via the passage.

In accordance with various advantageous embodiments of the invention the plunger remains in contact with the shutters in each position.

In accordance with various advantageous embodiments of the invention the space between the shutters is constant, or the space between the shutters is greater in a closed position than in an open position.

In accordance with various advantageous embodiments of the invention the opening or the third opening is a supply path.

In accordance with various advantageous embodiments of the invention at least one, or each tappet, is made of nonmagnetic material.

In accordance with various advantageous embodiments of the invention at least one, or each shutter, is made of nonmagnetic material.

In accordance with various advantageous embodiments of the invention the course of the plunger and/or of each tappet relative to the seats is less than 5.00 mm, for example less than 2.00 mm, e.g., less than 1.00 mm, in some instances less than 0.50 mm or 0.20 mm.

In accordance with various advantageous embodiments of the invention the distribution piston is connected to the regulation passage via the seat that uses the regulation passage.

In accordance with various advantageous embodiments of the invention the entry of the regulation passage communicates with the distribution entry independently of the opening or the closing of the valve.

In general, the advantageous embodiments of each subject of the invention can also be applied to the other subjects of the invention. Insofar as feasible, each subject of the invention can be combined with the other subjects.

The present valve has a more durable operation than know valves. The regulation level maintains its tightness in spite of the repetition of the actions. The surfaces providing the seals are exposed to weaker forces, both during the opening and the closing. The invention also proposes a solution decoupling the plunger from the shutters, which makes it possible to utilize the inertia of the plunger without creating any direct impact on the shutters. These benefits are maintained in spite of short response times and elevated autoclave pressure, for example reaching 400 bar.

DETAILED DESCRIPTION

In the following description, the terms interior or inner and exterior or outer relate to a positioning relative to the axis of movement of the plunger. The axial direction corresponds to the direction along the movement axis of the plunger.

Figure 1:
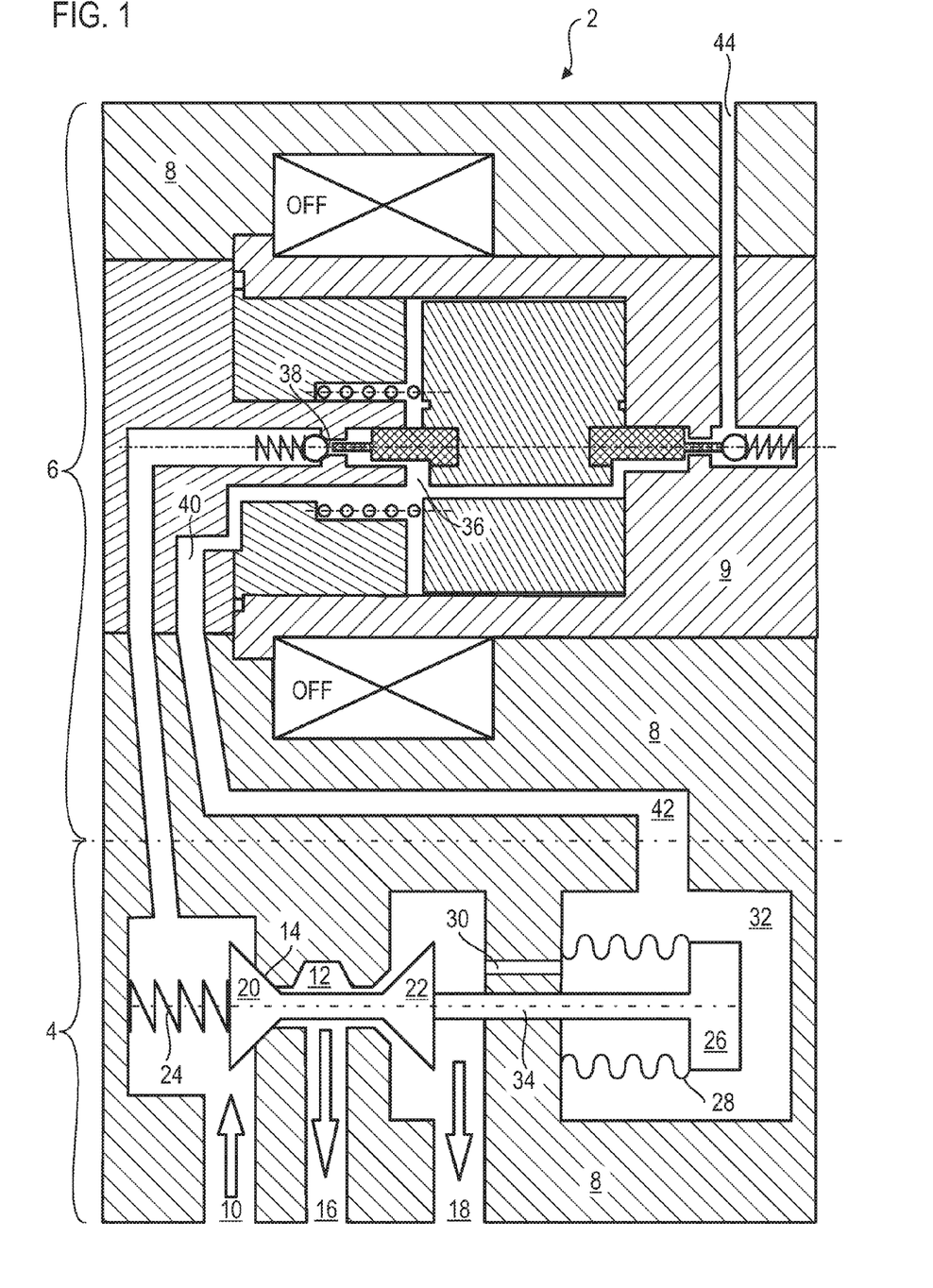
FIG. 1 shows an electromagnetic valve in a closed position, according to various embodiments of the invention.

FIG. 1 shows an electrically actuated valve 2, in various instances an electromagnetically and mechanically actuated valve. The valve 2 makes it possible to generate a flow of a pressurized, for example gaseous, fluid. The valve 2 is shown here in a closed state, the valve being in the state in the absence of electrical supply. However, the valve could be configured so as to remain open at rest and so as to close when energized.

The valve 2 comprises a distribution level 4 allowing the distribution of the fluid, and a regulation level 6, or control level 6, controlling the distribution level 4. The valve 2 can comprise a main body 8; in various instances common to the two levels, or alternatively formed in two parts. The regulation level 6 can comprise a ferromagnetic frame 9 making it possible to form a magnetic circuit in the regulation level 6. The frame 9 can form a material block with an inner chamber. The valve has an entry 10 common to the distribution level 4 and to the regulation level 6.

The distribution level 4 comprises a distribution passage 12 connecting a distribution entry 14 with a seat to a distribution exit 16 or user port. The distribution passage 12 optionally comprises an exhaust 18, possibly with a seat, the exit 16 being between the entry 14 and the exhaust 18. The distribution level 4 also comprises distribution valves (20; 22) cooperating with the seats of the distribution level 4 so as to block them. The valves (20; 22) are fixed to one another and are held in the closed position by a spring 24.

The distribution valves (20; 22) are controlled by a distribution piston 26 which is actuated by the pressure of the pressurized fluid of the valve 2. The piston 26 can be a piston 26 having bellows 28, or can be a piston inserted into a bore of corresponding diameter. The interior of the bellows 28 can be in communication with the nearby exhaust 18 with the aid of an orifice 30. The piston 26 is accommodated in a chamber 32 in which the pressure variations move the piston in translation; this translation is communicated to the valves (20; 22) via a rod 34. The pressure in the chamber 32 of the piston is controlled by the regulation level 6. The piston 26 assures a mechanical, pneumatic/hydraulic actuation.

The regulation level 6 comprises a regulation passage 36 connecting a regulation entry 38 with a seat to at least one regulation exit 40 or third opening 40. The regulation exit 40 is in hydraulic communication with the piston 26 of the distribution level 4 via a conduit 42. When the regulation level 6 opens, the pressure at the entry 10 of the valve 2 is thus exerted onto the piston 26 and moves it.

In various embodiments, the regulation passage 36 can comprise a regulation exhaust 44 with a seat, the regulation exit 40 being between the regulation entry 38 and the regulation exhaust 44. The regulation exhaust 44 accelerates the reduction in pressure on the piston 26 when the regulation level 6 is shut off.

Figure 2:
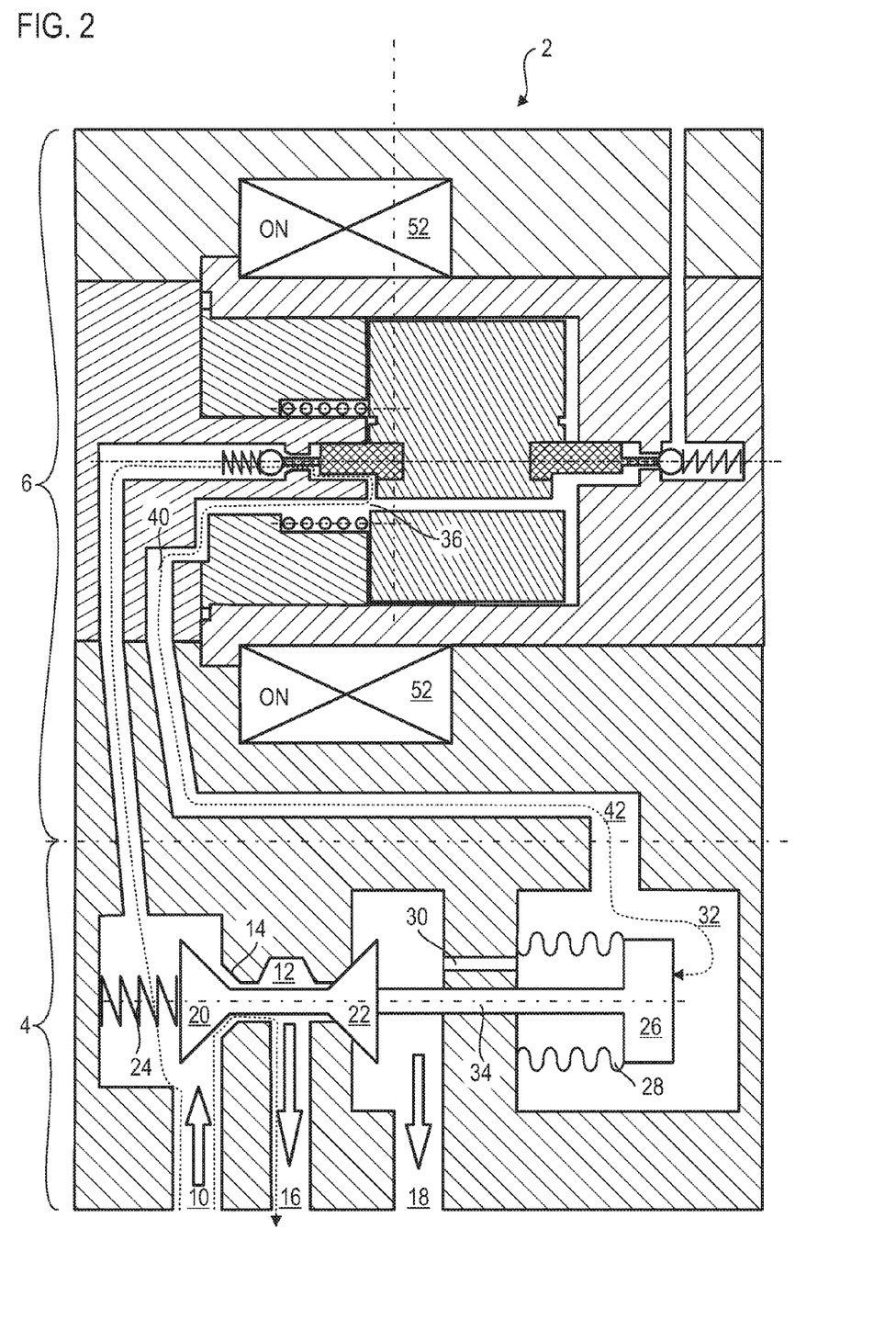
FIG. 2 shows the electromagnetic valve in an open position, according to various embodiments of the invention.

FIG. 2 shows the valve 2 in the open position. The regulation level is open and allows the pressure of the pressurized fluid to act in and on the distribution level.

The regulation level is open. The fluid passes through this level. A balance of the pressures is reached between the entry 38 and exit 40 of the level via the regulation passage 36 of the level. The conduit 42 communicates this pressure to the piston 26, which shifts the valves (20; 22). These then occupy an open position, in which the entry valve 20 opens its seat whereas the exhaust valve 22 closes its seat. The distribution entry 14 then communicates with the distribution exit 16, in various instances directly. The valve 2 is open.

Figure 3:
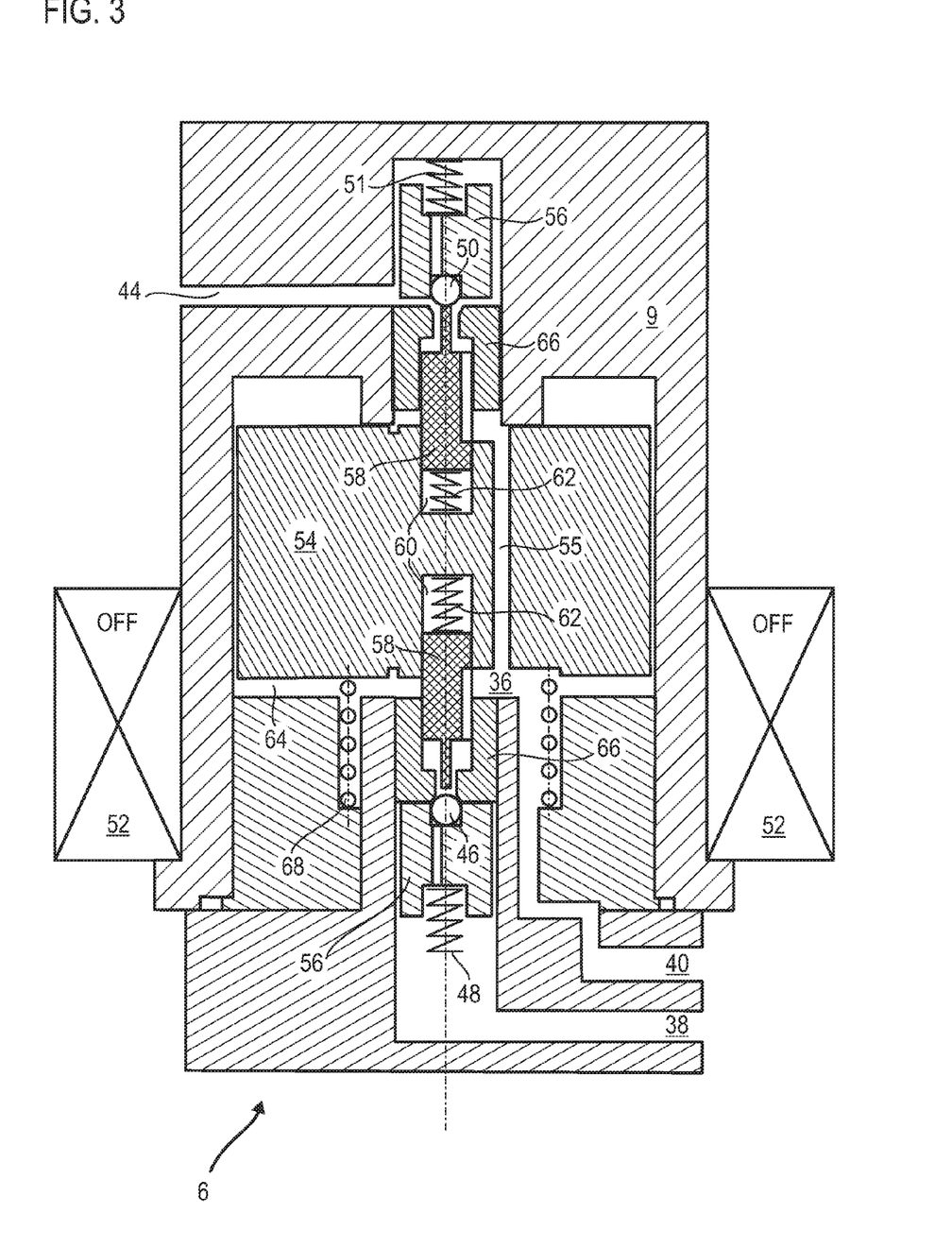
FIG. 3 shows an enlargement of a distribution level in a closed position, according to various embodiments of the invention.

FIG. 3 shows an enlargement of the regulation level 6 in the closed position, at rest, when the valve is not electrically supplied. The control level is not shown. The closed state of the regulation level 6 can be obtained by blocking the entry 38 thereof and/or by blocking the exit 40 thereof.

The regulation entry 38 comprises an entry shutter 46, such as an entry ball 46 making it possible to close the entry. The ball 46 can be disposed upstream of the entry seat, such that the pressure of the fluid keeps the entry closed, thus conferring an autoclave character. A spring 48 can participate in this closing effect. The choice of a ball 46 is advantageous because this element can be produced with strict tolerances of sphericity in the order of a micrometre, which limits leaks. The ball 46 can be impacted on its seat so as to deform the seat so that the sealing interface is more fitted.

The regulation exhaust 44 can comprise an exhaust shutter 50, such as a ball 50 on the downstream side of the seat in order to seal the seat, so that the pressure can contribute to opening the exhaust shutter. It should be noted that the two seats of the regulation level 6 are turned opposite one another. The seat faces each receiving a shutter face in the opposite direction to where the other seat is located. The shutters (46; 50) are placed in separate chambers, in various instances separated by another chamber; in this case the regulation passage 36. In the shown state the exhaust ball 50 is spaced apart from its seat such that the two faces of the piston remain at the pressure of the exhaust, that is to say with a pressure balance. The balls (46; 50) can be made of ceramic material in order to increase their durability and in order to limit their inertia. Their diameter can be equal to 1.59 mm, and the corresponding diameter of the orifices of the seats can be equal to 1.12 mm. These dimensions limit both the mass and the effects of the pressure of the fluid on the balls, which resist opening. An exhaust spring 51 acts on the exhaust shutter in order to hold it closed.

The regulation level 6 comprises a magnetic actuation means. The level can comprise a coil 52, which in various instances surrounds the regulation passage 36 and/or the regulation entry seat and/or the entry shutter 46. The coil 52 can comprise a plurality of units (a plurality of solenoids) disposed axially side-by-side and/or fitted one inside the other. The coil 52 can be disposed between the entry 38 and the exit 40 of the regulation level 6. The regulation passage 36 can also be surrounded by the magnetic frame 9 forming the magnetic circuit. The passage 36 comprises a face to which the entry 38 and the exit 40 lead. As a result, they are closer to one another and the pressure losses are limited for quicker reactions. However, it is conceivable to place the exit of the exhaust side relative to the magnetic means.

The regulation level 6 comprises a magnetic plunger 54, which is disposed in the interior of the coil 52, where it is subjected to the magnetic flux of the magnetic circuit. The magnetic plunger 54 is disposed between the shutters (46; 50) so as to be able to open each seat by moving towards the seat and by pushing the corresponding shutter. The regulation level 6 becomes axially shorter. By moving the plunger 54 away from the seat, the shutter closes the seat again by moving towards the seat. Each shutter is pushed or pushes towards the plunger 54.

The plunger 54 can form a movable face of the passage 36. The plunger 54 can comprise a ferromagnetic material so as to direct magnetic flux field lines. The plunger 54 is movable, and the movements thereof make it possible to open and close the regulation level 6. The plunger 54 can have a passage 55 connecting the entry 38 to the exhaust 44. This passage is optional because the controlled leaks around the plunger 54 can be sufficient to balance the pressures depending on the prevailing pressures and the time of the desired response.

At least one, or each shutter (46; 50) can comprise a ball, and in various instances a ball carrier 56 or shutter carrier 56. Each ball carrier 56 can comprise an orifice allowing circulation from one face to the other. However, the presence of this orifice is not indispensable because the leaks, in various instances controlled, around the ball carrier 56 can be sufficient to reach the pressure actuating the piston of the distribution level. Each ball carrier 56 can make it possible to center its ball (46; 50) and to form an intermediary with the associated spring (48; 51).

The regulation level 6 can comprise tappets 58 driven by the plunger 54. These cooperate with the shutters (46; 50). The tappets 58 can push the shutters (46; 50) away from their seats so as to allow an opening and a circulation of fluid via the passage 36. Each tappet 58 can also move away from its associated shutter (46; 50) such that the latter returns to its seat in order to assure a seal.

The tappets 58 can be mounted movably relative to the plunger 54. The plunger 54 can comprise cavities 60 receiving portions of tappets 58, and in various instances elastic means such as springs 62. The tappets 58 can thus retract and extend relative to the plunger 54. For each shutter (46; 50), the spring 62 of the tappet pushes in the direction opposite the shutter elastic means (48; 51). It is possible to create a mechanical chain, in various instances continuously, from one shutter (46; 50) to the other. In various instances, this makes it possible to eliminate the play between the tappets 58 and the shutters (46; 50), and also the contact impacts.

The elastic means 62 of the tappets 58 are superordinate to the elastic means (48; 51) of the shutters (46; 50). The elastic means 62 of tappets 58 can be stiffer than the elastic means (48; 51) of shutters (46; 50). The opposite is possible, for example by acting on the preloads.

The movement of the plunger 54 can be decoupled from the tappets 58 and therefore the shutters (46; 50). The plunger 54 can have a longer course than the movement necessary to open a shutter (46; 50). It is therefore possible to modulate, and in various instances increase, the air gaps 64 on either side of the plunger 54.

The plunger 54 can comprise stop surfaces, in particular axial stop surfaces, cooperating with the tappets 58. The elastic means 62 of the tappets 58 can then be less stiff than the elastic means (48; 51) of the shutters (46; 50). This arrangement makes it possible to shift the mechanical play, such that the play is no longer present at the shutters, but between the plunger 54 and the tappets 58. The interfaces with the shutters (46; 50) are thus preserved over time.

At least one, or each tappet 58, can be made of an nonmagnetic material, for example in order to avoid magnetic short circuits. They can comprise portions of reduced thickness, such as needles passing through each seat. A shutter (46; 50) can then be actuated from the face opposite the seat.

The seats of the regulation level can be formed on connected parts 66, in various instances made of nonmagnetic materials. They can also serve as a tappet guide 66. At least one, or each tappet guide 66 can comprise a guiding surface in which the corresponding tappet 58 slides. A passage can be formed between each or at least one pair constituted by a tappet 58 and tappet guide 66, for example on the tappet 58. This passage allows a circulation of fluid and/or a balancing of the pressures.

A regulation spring 68 can plate the plunger 54 in its closed position. This spring 68 bears against the face incorporating the entry and the exit. The regulation passage 36 passes through this spring.

The tappets 58 are introduced into the plunger 54. However, each tappet interface can be brought towards the adjacent shutter. For example, these interfaces can be in the interior of the tappet guides. The plunger can comprise bearing surfaces introduced into, and sliding in the interior of the guides. These guides can then be plunger guides.

Figure 4:
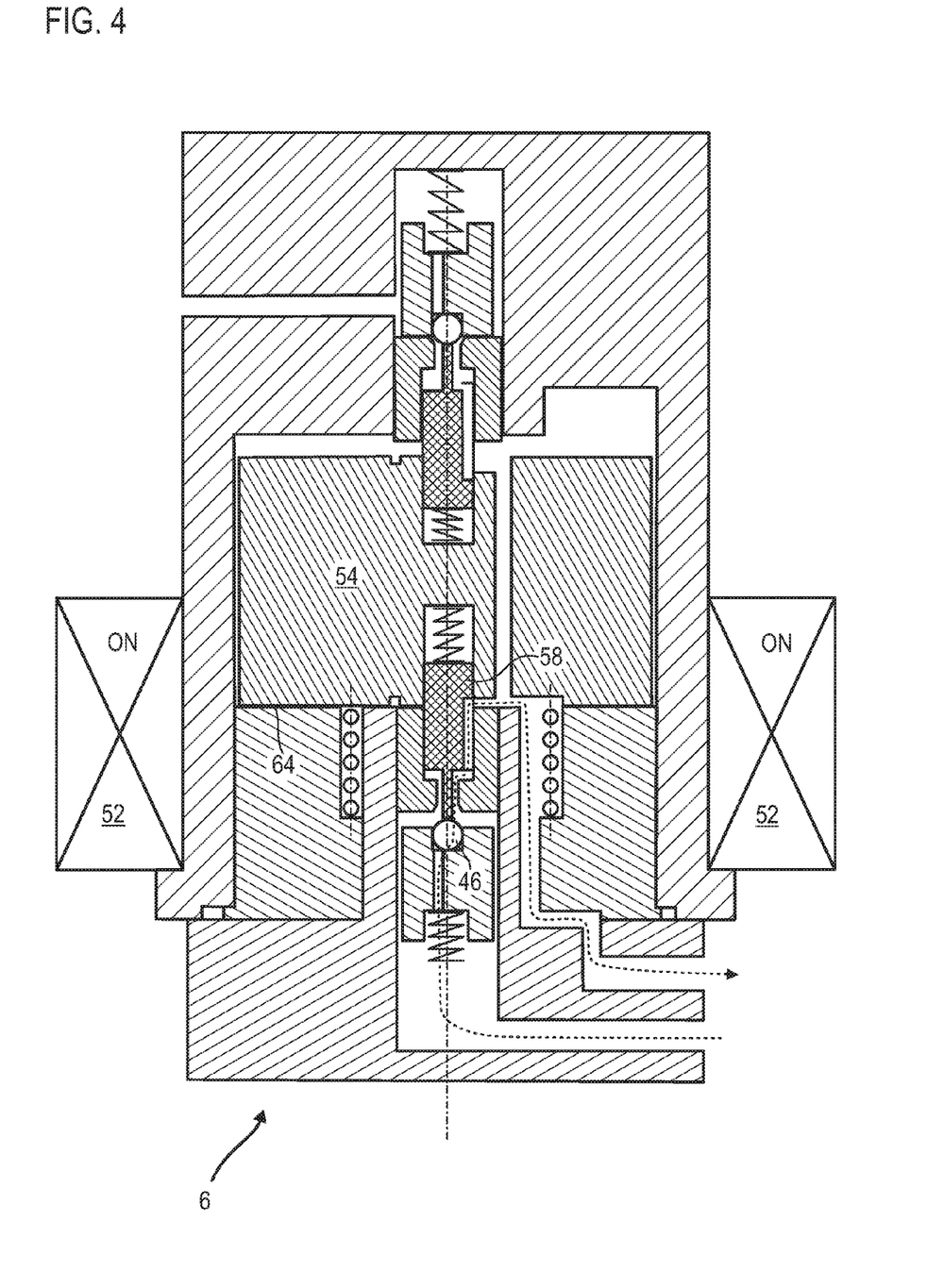
FIG. 4 shows an enlargement of the distribution level in an open position, according to various embodiments of the invention.

FIG. 4 is a view of the valve in the open position. The actuation means 52 are energized. Current circulates in the coils 52.

The magnetic means 52 generate a magnetic flux in the magnetic circuit of the frame, and therefore a force tends to close the air gap 64 by moving the plunger 54 towards the entry shutter 46. By means of the entry tappet 58, the plunger pushes the entry shutter 46 out of its seat and opens the regulation level 6. The opening can be partial. It allows a circulation or a balancing of the pressures, making it possible to actuate the distribution level and to open it as shown in FIG. 2.

The different embodiments presented above can be combined. Different arrangements between the entry, the exit and the exhaust are envisioned. The entry and the exit can be on two opposite faces of the passage and/or relative to the plunger. The plunger can be fitted in the passage. The regulation level has three paths, but could have two paths, similarly to the valve.

What is claimed is:

1. An electromagnetic valve, said valve comprising:
   two seats each oriented opposite the other seat;
   two shutters that each cooperate with one of the seats so as to be able to block and open the respective seat;
   a passage connecting the seats; and
   a magnetic circuit with a magnetic plunger able to be driven by a magnetic field source, the plunger moving the shutters relative to their respective seats,
   wherein the plunger is placed between the shutters such that each shutter closes its respective seat by moving the plunger away from the seat, and
   wherein the valve further comprises tappets cooperating with the shutters, each tappet being able to displace one of the shutters by passing through the associated seat, wherein at least one tappet is mounted movably relative to the plunger so as to be retractable in the plunger, the plunger comprising at least one spring configured to deploy the tappets outside the plunger.

2. The electromagnetic valve according to claim 1, wherein at least one tappet comprises a portion of reduced thickness cooperating with one of the shutters.

3. The electromagnetic valve according to claim 1, wherein the plunger comprises a through-duct configured to connect the seats of the passage.

4. The electromagnetic valve according to claim 1 further comprising at least one plunger guide.

5. The electromagnetic valve according to claim 4, wherein at least one seat is formed on the at least one plunger guide.

6. The electromagnetic valve according to claim 5, wherein at least one of the at least one plunger guide is made of nonmagnetic material.

7. The electromagnetic valve according to claim 1 further comprising at least one shutter carrier, each shutter carrier being configured to center its shutter relative to the associated seat during the opening and closing movements of the shutters.

8. The electromagnetic valve according to claim 1 further comprising a magnetic field source, one of the seats being disposed in the interior of the magnetic field source, the passage passing through the magnetic field source.

9. The electromagnetic valve according to claim 1 further comprising a plunger spring holding the plunger in a closed configuration in which one of the two shutters is closed, and in which the other of the two shutters is open.

10. The electromagnetic valve according to claim 1 further comprising at least one shutter spring configured to hold each associated shutter in a closed position against the associated seat.

11. The electromagnetic valve according to claim 1, wherein the passage comprises a side with an entry and an exit, the plunger comprises a face configured to allow communication between the entry and the exit when the plunger is plated towards or against the entry exit side.

12. The electromagnetic valve according to claim 1, wherein the passage comprises a third opening that is distanced from the seats connected by the passage.

13. The electromagnetic valve according to claim 1, wherein at least one shutter is a ball having a diameter comprised between 1.59 mm and 2.00 mm.

14. The electromagnetic valve according to claim 1, wherein the passage is a regulation passage, and the valve additionally comprises a fluid distribution level in communication with the regulation passage, the distribution level comprising a distribution passage, a distribution entry with a seat, a distribution exit with a seat, and two valves selectively opening and closing the distribution entry seat and the distribution exit seat.

15. The electromagnetic valve according to claim 14, wherein the distribution valves are controlled by a distribution piston in communication with the regulation passage.

16. An electromagnetic valve, said valve comprising:
two seats each oriented opposite the other seat;
two shutters that each cooperate with one of the seats so as to be able to block and open the respective seat;
a passage connecting the seats; and
a magnetic circuit with a magnetic plunger able to be driven by a magnetic field source, the plunger moving the shutters relative to their respective seats,
wherein the plunger is placed between the shutters such that each shutter closes its respective seat by moving the plunger away from the seat, and
wherein the valve comprises three openings, the fluid being able to flow from a first opening to one of the second and third openings, the second and third openings being each in fluidic connection with a respective seat of the two seats, such that when a shutter blocks one of the two seats, the fluid can flow from the first opening to the opening in fluidic connection with the other of the two seats, and vice versa, and
wherein the plunger comprises a through-duct configured to connect the seats of the passage,
and the valve further comprises at least one plunger guide, wherein at least one of the seats is formed on said plunger guide.

\* \* \* \* \*